(12) United States Patent
Allison et al.

(10) Patent No.: US 6,363,076 B1
(45) Date of Patent: Mar. 26, 2002

(54) PHANTOM BUFFER FOR INTERFACING BETWEEN BUSES OF DIFFERING SPEEDS

(75) Inventors: Samuel Steven Allison, Fuquay-Varina; Kenneth James Barker, Cary; Joseph Kinman Lee, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/014,334

(22) Filed: Jan. 27, 1998

(51) Int. Cl.[7] .......................... H04L 12/28; G06F 12/00
(52) U.S. Cl. ...................... 370/419; 711/149; 370/465
(58) Field of Search ..................... 370/359, 419, 370/451, 463, 465, 412, 364, 365, 421; 710/53, 56, 57, 128, 129; 711/149

(56) References Cited

U.S. PATENT DOCUMENTS

| | | | |
|---|---|---|---|
| 4,400,772 A | 8/1983 | Broyles et al. ............. 364/200 |
| 4,692,894 A | 9/1987 | Bemis ........................ 364/900 |
| 4,849,970 A | 7/1989 | McCool ...................... 370/100 |
| 4,884,286 A | 11/1989 | Szcdzepanek et al. ...... 375/118 |
| 5,210,749 A | 5/1993 | Firoozmand ............... 370/85.1 |
| 5,212,742 A | * 5/1993 | Normile et al. .............. 382/56 |
| 5,224,213 A | * 6/1993 | Dieffenderfer et al. ....... 710/53 |
| 5,428,649 A | 6/1995 | Cecchi ........................ 375/372 |
| 5,471,581 A | 11/1995 | Munier et al. .............. 395/250 |
| 5,485,584 A | 1/1996 | Hausman et al. ........... 395/842 |
| 5,524,270 A | * 6/1996 | Haess et al. .................. 710/53 |
| 5,604,740 A | * 2/1997 | Pinault et al. .............. 370/463 |
| 5,623,608 A | 4/1997 | Ng ............................. 395/250 |
| 5,627,568 A | 5/1997 | Sherlock et al. ............ 348/185 |
| 5,636,358 A | * 6/1997 | Brant et al. ................. 711/117 |
| 5,784,573 A | * 7/1998 | Szczepanek et al. ........ 370/463 |
| 5,796,963 A | * 8/1998 | Odom ........................ 710/128 |
| 5,809,026 A | * 9/1998 | Wong et al. ................ 370/463 |
| 5,818,844 A | * 10/1998 | Singh et al. ................ 370/463 |
| 5,832,216 A | * 11/1998 | Szczepanek ................ 710/128 |
| 5,852,608 A | * 12/1998 | Csoppenszky et al. ...... 370/465 |
| 6,000,037 A | * 12/1999 | Herbert ...................... 713/400 |
| 6,047,339 A | * 4/2000 | Su et al. ...................... 710/56 |
| 6,067,595 A | * 5/2000 | Lindenstruth ............... 710/129 |

* cited by examiner

Primary Examiner—Chau Nguyen
Assistant Examiner—Andy Lee
(74) Attorney, Agent, or Firm—Myers Bigel Sibley & Sajovec, P.A.

(57) ABSTRACT

Methods, systems or apparatus and computer program products are provided that interface between two data buses operating at different speeds. Such interfaces utilize a buffer which has an apparent size larger than the physical size of the buffer to receive blocks of data which are larger than the size of the buffer. The apparent size of the buffer is created by simultaneously writing data to and reading data from the buffer such that the same storage locations may be used more than once to hold the data. The present invention may be utilized for receiving data from either the high speed or the lower speed bus.

29 Claims, 5 Drawing Sheets

PHANTOM BUFFER FOR INTERFACING BETWEEN BUSES OF DIFFERING SPEEDS

FIELD OF THE INVENTION

The present invention relates generally to bus interfaces and more particularly to bus interfaces for interfacing between buses of different speeds.

BACKGROUND OF THE INVENTION

In recent years, more and more emphasis has been placed on networking computers to provide local area networks. In such a computer network, one critical component is the network interface which allows communication between a users computer and other computers in the network such as a server or other computer workstation. Typically, a computer's network interface, among other things, allows communications between the high speed internal bus of the computer and the lower speed external bus of the network.

One example of communication between a high speed bus and a lower speed bus occurs in such network interface cards (NIC) such as an Ethernet adapter. In a typical Ethernet adapter for use in a typical personal computer, the adapter interfaces with the processor and other hardware of the personal computer through a Peripheral Component Interconnect bus (PCI bus) internal to the computer. The PCI bus is a synchronous bus which operates on 30 nanosecond cycles. The Ethernet adapter also communicates with the Ethernet media which operates at a different speed from the PCI bus. In order to accommodate the differing operating speeds of the buses with which the adapter communicates, a buffering scheme may be employed by the adapter where data from either bus is first stored in the adapter before being transmitted onto the other bus.

In making the conversion from the PCI bus to the Ethernet media, the communication typically passes through differing clock domains. For example, in a 10/100 Ethernet adapter the data may be received from the 30 ns/cycle synchronous PCI bus and may be stored in transmit and receive buffers which are accessed by a 40 ns/cycle synchronous internal adapter bus. This transfer of data across clock domains may present problems in the design of a network adapter.

One technique to overcome the differences between the higher speed PCI bus and a lower speed internal bus of an Ethernet adapter is to store the data received from the PCI bus in a buffer and then transmit the data to the transmit buffer or receive data from the receive buffer and transmit the data onto the PCI bus. While this buffering technique allows for communication across the two clock domains of the two buses, such a buffering technique typically requires a buffer that is large enough to hold all of the data of a block of data transmitted on the PCI bus. Such a large buffer may be impractical or expensive to implement. Furthermore, the speed with which information could be transferred between the PCI bus and the internal transmit and receive buffers may be reduced by the delay of the buffering operation.

Another example of an interface between two differing buses is illustrated in U.S. Pat. No. 4,400,772 which describes the use of a random access memory (RAM) buffer and the isolation of the buses with a bus buffer. This dual use method, however, is limited to blocks of data which are no larger than the size of the RAM buffer. Furthermore, the operations of the interface are serial in that when one operation is loading RAM the other user of the RAM is isolated from the bus. Data is first loaded into the RAM and then, after the load operation is completed, read from the RAM, thus creating a latency delay between the transmission and receipt of the data.

Other examples of the use of buffers, RAMs and first-in-first-out buffers are seen in U.S. Pat. Nos. 5,627,568, 5,623,608, 5,471,581, 5,485,684, 5,428,649, 5,210,749, 4,884,286, 4,849,970, and 4,629,894.

In light of the above discussion, a need exists for improvement in the interfacing between buses operating at different speeds which would allow devices operating at different speeds to more efficiently communicate.

SUMMARY OF THE INVENTION

In view of the above discussion, it is an object of the present invention to provide increased performance in interfacing between buses operating at different speeds.

A further object of the present invention is to provide for decreased latency in transferring data between differing clock domains.

Still another object of the present invention is to provide for decreased size interface circuits for interfacing between differing clock domains.

These and other objects of the present invention are provided by methods, systems or apparatus. and computer program products that interface between two data buses operating at different speeds. Such interfaces utilize a buffer which has an apparent size larger than the physical size of the buffer to receive blocks of data which are larger than the size of the buffer. The apparent size of the buffer is created by simultaneously writing data to and reading data from the buffer such that the same storage locations may be used more than once to hold the data. The present invention may be utilized for receiving data from either a high speed for transmission to a lower speed bus or the lower speed bus for transmission to the higher speed bus.

In one embodiment of the present invention the interface between buses of differing speeds involves receiving a block of data at a first port of a dual port buffer from a first data bus at a first speed. However, the amount of data in the block of data is larger than the amount of data which may be simultaneously stored in the dual port buffer. A first portion of the data from the block of data is transmitted from a second port of the dual port buffer to the second data bus at a second speed, slower than the first speed, while a remaining portion of the data from the block of data is received by the dual port buffer.

Preferably, the amount of data in the block of data is less than or equal to the amount of data which may be simultaneously stored in the dual port buffer multiplied by the ratio of the rate at which data may be received by the dual port buffer from the first data bus to the difference between the rate at which data may be received by the dual port buffer from the first data bus and the rate at which data may be transmitted on the second data bus by the dual port buffer.

By simultaneously storing and transmitting data from the dual port buffer, the present invention allows for use of a dual port buffer which is smaller than the block of data. Thus, the size of the buffer may be reduced over conventional interfaces. Alternatively, for a given size buffer, the amount of data in a block of data may be increased, thus increasing the efficiency of data transfers as the amount of data per transfer may be increased without increasing the overhead for a transfer. Furthermore, because the transfer of data into and out of the buffer occurs at the same time the latency through the buffer may be reduced.

In particular embodiments of the present invention, initial data from the block of data is stored in the dual port buffer. The amount of this initial data from the block of data corresponds to the amount of data which may be simultaneously stored in the dual port buffer. Additional data from the block of data is then stored in the dual port buffer so as to overwrite at least a portion of the initial data. Preferably, the additional amount of data is stored in a same sequence of storage locations of the dual port buffer beginning with the first storage location of the initial data from the block of data so as to overwrite at least a portion of the initial data.

In a further embodiment of the present invention, a first portion of a block of data at a second port of a dual port buffer is received from a second data bus operating at a second speed. Again, the amount of data in the block of data is larger than an amount of data which may be simultaneously stored in the dual port buffer and the first portion of the block of data comprises an amount less than or equal to the amount of data which may be simultaneously stored in the dual port buffer. The first portion of the data from the block of data is transmitted from a first port of the dual port buffer to a first data bus at a first speed, wherein the first speed is higher than the second speed, while a remaining portion of the data from the block of data is received by the second port of the dual port buffer.

By loading the buffer with data before beginning the transfer on the higher speed bus, the present invention may also be used for transfers from the lower speed bus to the high speed bus. The present invention also provides a buffer having an apparent size larger than the physical size of the buffer for such transfers and, therefore, also reduces the size requirements for the buffer or increases the size of blocks of data that may be transferred. Similar latency benefits are also achieved.

In a further embodiment of the present invention, the size of the block of data is less than or equal to the amount of data which may be simultaneously stored in the dual port buffer multiplied by a ratio of the rate at which data may be transmitted by the dual port buffer to the first data bus to the difference between the rate at which data may be transmitted by the dual port buffer to the first data bus and the rate at which data may be received from the second data bus by the dual port buffer. Preferably, the first portion of the block of data stored in the dual port buffer corresponds to the amount of data which may be simultaneously stored in the dual port buffer.

In still another embodiment of the present invention, the remaining portions of the block of data received at the second port of the dual port buffer may be stored in the dual port buffer so as to overwrite at least a portion of the first portion of the block of data. In such a case, the additional data from the block of data may be stored in the dual port buffer in the same sequence of storage locations of the dual port buffer beginning with the first storage location of the first portion of the block of data so as to overwrite at least a portion of the first portion of the block of data.

In a particular embodiment of the present invention, an interface circuit that interfaces between two buses operating at different speeds is provided which includes a first input port that receives information from a first data bus at a first speed and a first output port that transmits information to a second data bus at a second speed slower than the first speed. The interface circuit also includes a data storage device that stores information received from the first bus where the data storage device has an apparent size to the first data bus of greater than the physical size of the data storage device. Preferably, the size of the data storage device is less than the size of a block of data received from the first input port and greater than or equal to the size of the block of data multiplied by the ratio of the first speed to the difference between the first speed and the second speed.

The interface circuit may also include a second input port that receives information from the second data bus at the second speed and a second output port that transmits information to the first data bus at the first speed. Furthermore, the first input port and the second output port may be a first input/output port that receives information from and transmits information to the first data bus at the first speed. Also, the second input port and the first output port may be a second input/output port that receives information from and transmits information to the second data bus at the second speed.

A state machine and arbitrator may also be included in the interface circuit such that the state machine and arbitrator coordinates access to the first data bus and the second data bus. In one embodiment, the state machine and arbitrator preferably causes the data storage device to be filled with data from the second data bus prior to initiating a data transfer from the first input/output port to the first data bus. The state machine and arbitrator also continues to allow data to be provided to the second input/output port while the transfer of data from the first input/output port to the first data bus progresses. In another embodiment of the present invention, the state machine and arbitrator allows data to be stored in the data storage device only when data may transmitted from the data storage device through the second input/output port to the second data bus.

In particular embodiment of the present invention, the first data bus comprises a PCI data bus and wherein the second data bus comprises an internal data bus of an ethernet adapter. Furthermore, the second port may be connected to send and receive data storage devices.

As will be appreciated by those of skill in the art, the present invention may be embodied as methods, apparatus or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, system, apparatus, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Operations for various aspects of the present invention are illustrated herein in flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or by combinations of special purpose hardware and computer instructions.

Figure 1:
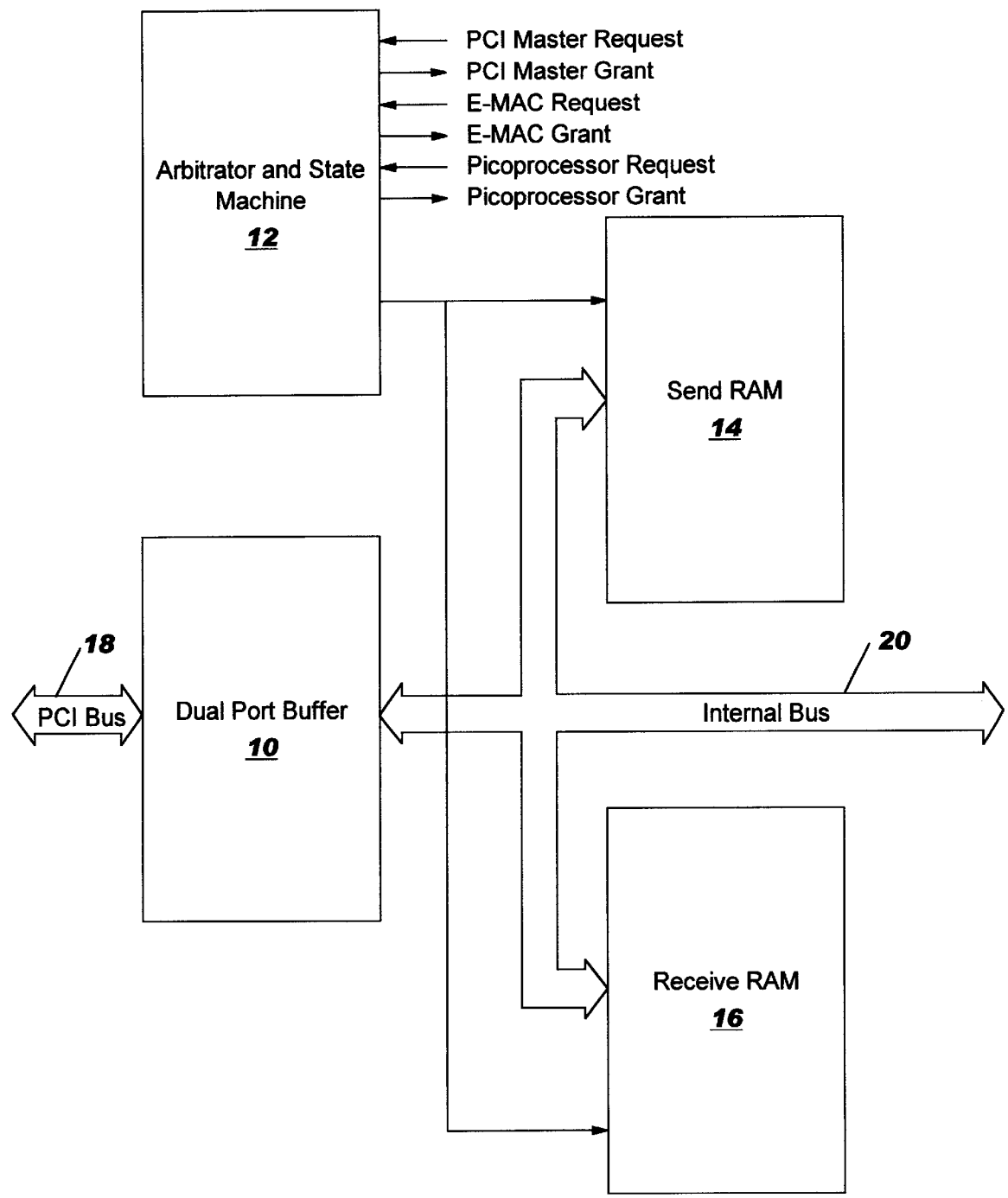
FIG. 1 is a block diagram illustrating aspects of one embodiment of the present invention.

FIG. 1 illustrates one embodiment of the present invention. As seen in FIG. 1, network interface card includes a dual port buffer 10 which has one port connected to a PCI Bus 18 and a second port connected to an internal bus 20 of the network interface. Also connected to the internal bus 20 are Send RAM 14 and Receive RAM 16. As would be appreciated by those of skill in the art, additional devices, such as a picoprocessor (not shown) or a physical interface to the network may also be connected to the internal bus 20 for access to the Send RAM 14 and the Receive RAM 16. Also illustrated in FIG. 1 is an Arbitrator and State Machine 12 which controls access to the Internal Bus 20 as well as coordinating the operations of the Dual Port Buffer 10 and the Send and Receive RAMs 14 and 16.

In a particular embodiment of the present invention where the network interface card is a 10/100 Mb Ethernet adapter, PCI Bus 18 may operate on a 30 nS/cycle clock speed and the internal bus 20 may operate at a slower, 40 nS/cycle clock speed. As used herein the phrase bus speed or clock speed is used to describe the rate at which data may change as it is transferred across the bus. Thus, for example, with a 30 nS/cycle bus speed the data on the bus may change every 30 nanoseconds. Accordingly, a device receiving data from the bus is preferably capable of receiving new data every 30 nS and a device transmitting data onto the bus is preferably capable of transmitting new data onto the bus every 30 nS. Also, as used herein, the phrase clock domain refers to a bus which operates at a common speed for the devices on the bus. Thus, for example, in FIG. 1, the PCI Bus 18 would be in one clock domain and the Internal Bus 20 would be in a second clock domain.

In operation, a block of data is received from the PCI Bus 18 by the Dual Port Buffer 10 and the block of data is transferred through the Dual Port Buffer 10 to the Internal Bus 20 and onto the Send RAM 14 via the second port of the Dual Port Buffer 10. Similarly, a block of data may be provided over the Internal Bus 20 to the Dual Port Buffer 10 by the Receive RAM 16 and then transmitted out the first port of the Dual Port RAM 10 to the PCI Bus 18. The size of the Dual Port Buffer 10 is less than the size of the block of data transferred through the Dual Port Buffer 10, however, the Dual Port Buffer 10 has an apparent size to the PCI Bus 18 and the Internal Bus 20 of at least the size of the block of data. As used herein, the phrase apparent size of the Dual Port Buffer 10 refers to the amount of data which may be transferred through the Dual Port Buffer 10 in a single operation on a bus.

Thus, the Dual Port Buffer 10 provides a first input port that receives information from a first data bus, such as the PCI Bus 18, at a first speed and a first output port that transmits information to a second data bus, such as the Internal Bus 20, at a second speed slower than the first speed. The Dual Port Buffer 10 also provides a data storage device that stores information received from the first bus such that the data storage device has an apparent size to the first data bus of greater than the physical size of the data storage device. As will be appreciated by those of skill in the art, the Dual Port Buffer 10 may be a dual port FIFO, dual port RAM or other such device which allows for the simultaneous storage and retrieval of information from a storage device.

Figure 2:
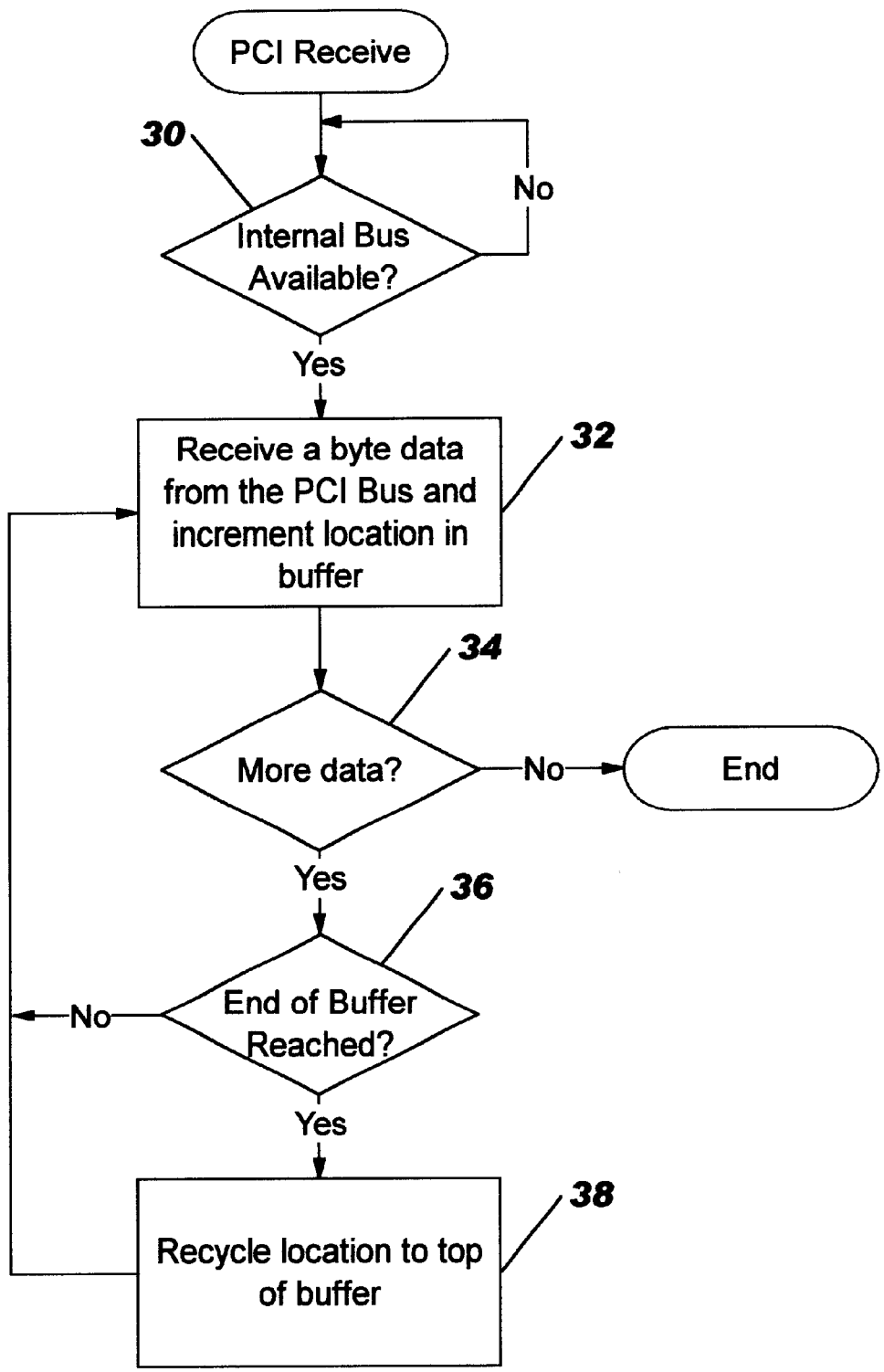
FIG. 2 is a flowchart illustrating the operations of the present invention from the perspective of the higher speed bus in receiving data from the higher speed bus.

The operation of the interface circuit illustrated in FIG. 1 is described in FIGS. 2 through 5. Referring now to FIG. 2, data is only received from the PCI Bus 18 if the Internal Bus 20 is available. This determination of the availability of the Internal Bus 20 may be made by the Arbitrator and State Machine 12 which may guarantee that the Internal Bus 20 is available to transfer data when the block of data is received from the PCI Bus 18 by selective grant of requests for the Internal Bus 20. If the Internal Bus 20 is available, then the PCI Bus transfer commences and 4 bytes of data (corresponding to the width of the PCI Bus 18) are stored in the Dual Port Buffer 10 at a starting storage location and the location for storage of the next 4 bytes of data is incremented (block 32).

After storing the data in the Dual Port Buffer 10, if more data is available (block 34) then it is determined if the end of the buffer has been reached (i.e. 4 bytes of data have been stored in each storage location of the buffer) (block 36). If the end of the buffer has not been reached, then the next 4 bytes of data are received from the PCI Bus 18 and stored in the specified storage location which is then incremented (blocks 36 and 32). However, if the end of the buffer has been reached, then the location for storage of the next 4 bytes of data of the data block is set to the original starting storage location of the Dual Port Buffer 10 (block 38). The next 4 bytes of data received from the PCI Bus 18 are then stored in the starting location and overwrite whatever information is stored in that location (block 32). The storage location is then incremented and this process continues until all of the information of the data block has been received from the PCI Bus 18.

The storage location where data is to be stored in the Dual Port Buffer 10 may be maintained external to the Dual Port Buffer 10, for example if the Dual Port Buffer 10 is a dual port RAM, or it may be internal to the Dual Port Buffer 10, for example if the Dual Port Buffer 10 is a dual port FIFO. Furthermore, the recycling of the storage location to the starting storage location may be controlled by, for example, the Arbitrator and State Machine 12 external to the Dual Port Buffer 10 or it may be controlled internally to the Dual Port Buffer 10 by, for example, incrementing a storage location counter which loops back to an initial value when the counter reaches its maximum count or a predefined count.

Figure 3:
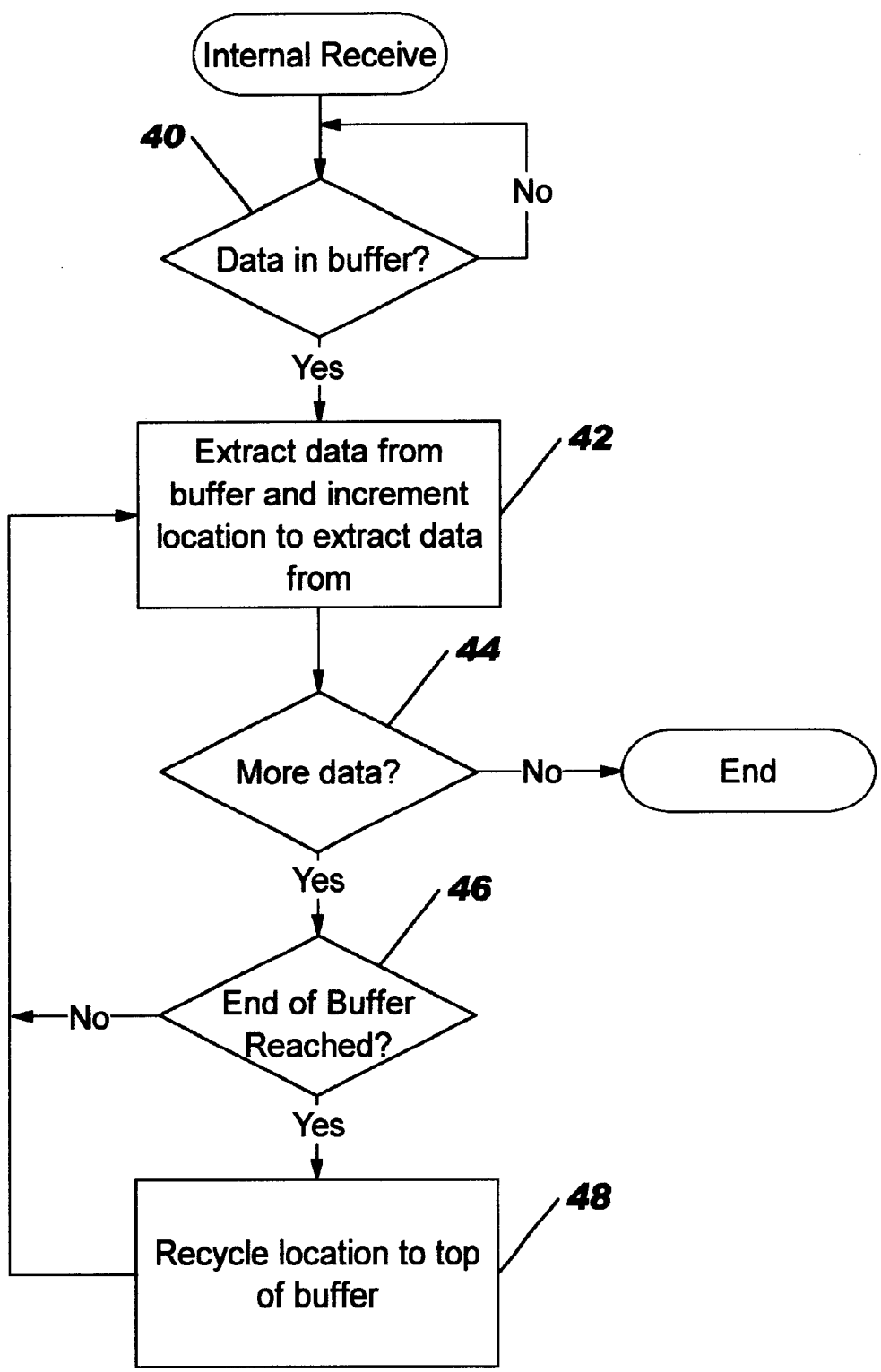
FIG. 3 is a flowchart illustrating the operations of the present invention from the perspective of the lower speed bus in receiving data from the higher speed bus.

FIG. 3 illustrates the operations occurring on the Internal Bus 20 side of the Dual Port Buffer 10 while the operations of FIG. 2 are carried out. As seen in FIG. 3, when data is placed in the buffer from the PCI Bus 18 (block 40), the data is extracted from the Dual Port Buffer 10 at a starting location where the data was first stored (Block 42). The data is placed on the Internal Bus and the location where the next bytes of data will be read from the Dual Port Buffer 10 is incremented to the next location of stored data (block 42).

After reading the data from the Dual Port Buffer 10, if more data is available (block 44) then it is determined if the end of the buffer has been reached (i.e. 4 bytes of data have been read from each storage location of the buffer) (block 46). If the end of the buffer has not been reached, then the next 4 bytes of data are read from the Dual Port Buffer 10 at the specified storage location which is then incremented (blocks 46 and 42). However, if the end of the buffer has been reached, then the location from which the next 4 bytes of data of the data block will be read is set to the original starting storage location of the Dual Port Buffer 10 (block 48). The next 4 bytes of data read from the Dual Port Buffer 10 are read from the starting location (block 42). The storage location is then incremented and this process continues until all of the information of the data block has been read from the Dual Port Buffer 10.

By simultaneously writing information to the Dual Port Buffer 10 and reading information from the Dual Port Buffer 10, the apparent size of the Dual Port Buffer 10 may be increased because the read operations make available storage locations where additional data may be written. The latency from the receipt of the first byte to the storage of the data in the Send RAM 14 may also be reduced as all of the data need not be received before the transfer to the Send RAM 14 is begun. Furthermore, the size of the interface circuit may be reduced as the size of the Dual Port Buffer 10 is smaller than the amount of data transferred in the data block. The present invention may also provide increased performance as it allows for larger block sizes for a given size buffer.

Similar benefits may also be obtained in transfers of data from the Receive RAM 16 to the PCI Bus 18. In such a case the Receive RAM 16 has already been loaded with a portion of the information to be transmitted to the PCI Bus 18. This information is then transferred through the Dual Port Buffer 10 as described in FIGS. 4 and 5.

Figure 4:
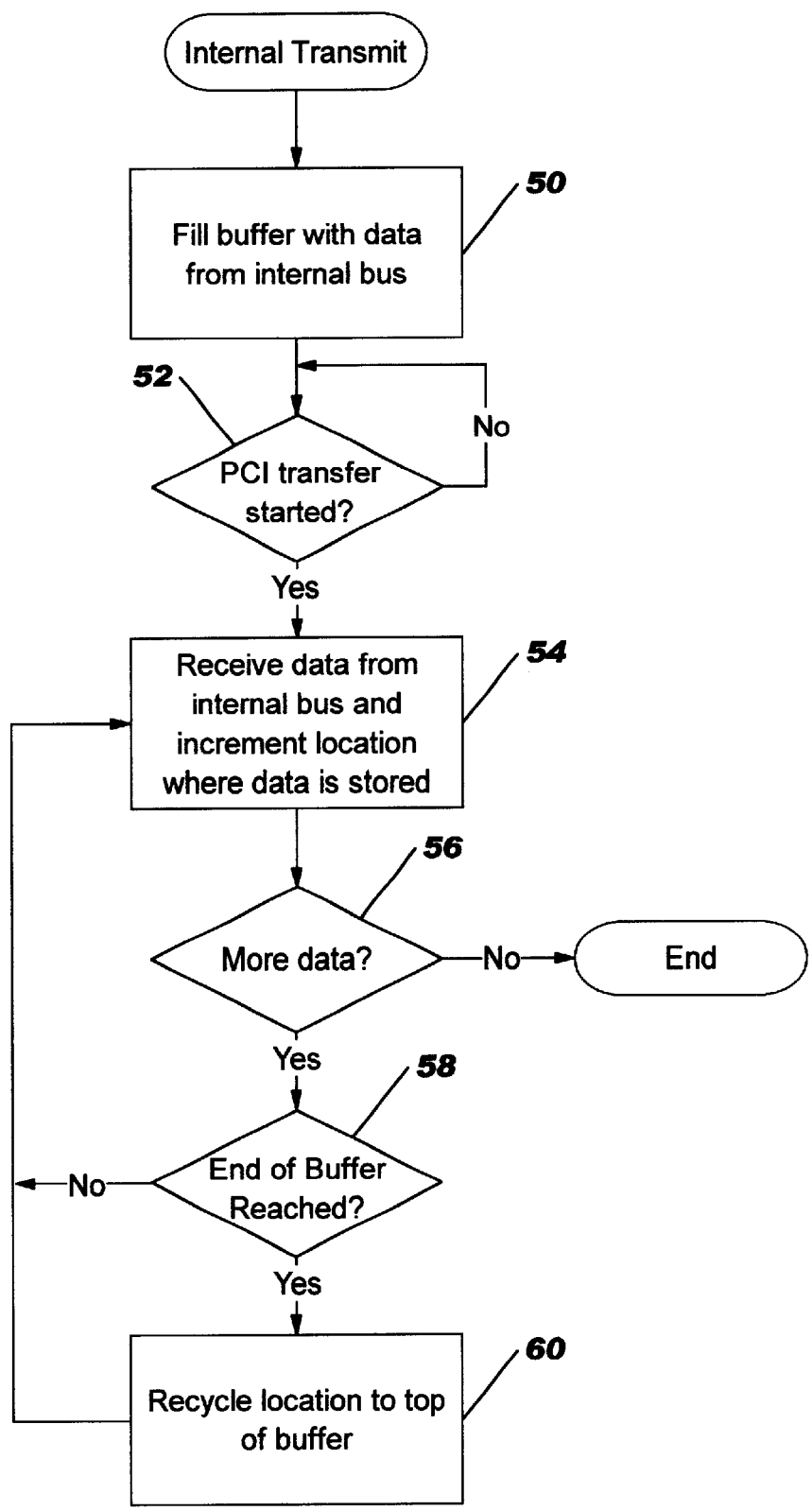
FIG. 4 is a flowchart illustrating the operations of the present invention from the perspective of the lower speed bus in transmitting data to the higher speed bus.

As seen in FIG. 4, the first operation in transmitting data to the PCI bus 18 is to fill the Dual Port Buffer 10 with data from the Internal Bus 20 (block 50). Once the transfer on the PCI Bus 18 is begun (block 52) (i.e. data is being read from the buffer and placed on the PCI Bus 18, see FIG. 5, block 72) data is received from the Internal Bus 20 and stored at the starting storage location where data was loaded into the Dual Port Buffer 10 in block 50 (block 54). The location where data is to be stored is then incremented in the same sequence that data was stored in the Dual Port Buffer 10 (block 54).

After storing the data in the Dual Port Buffer 10, if more data is available (block 56) then it is determined if the end of the buffer has been reached (i.e., 4 bytes of data have been stored in each storage location of the buffer so as to overwrite the initial portion of data stored in the buffer) (block 58). If the end of the buffer has not been reached, then the next 4 bytes of data are received from the Internal Bus 20 and stored in the specified storage location which is then incremented (blocks 58 and 54). However, if the end of the buffer has been reached, then the location for storage of the next 4 bytes of data of the data block is set to the original starting location of the Dual Port Buffer 10 (block 60). The next 4 bytes of data received from the Internal Bus 20 are then stored in the start location and overwrite whatever information is stored in that location (block 54). The storage location is then incremented and this process continues until all of the information of the data block has been received from the Internal Bus 20.

Figure 5:
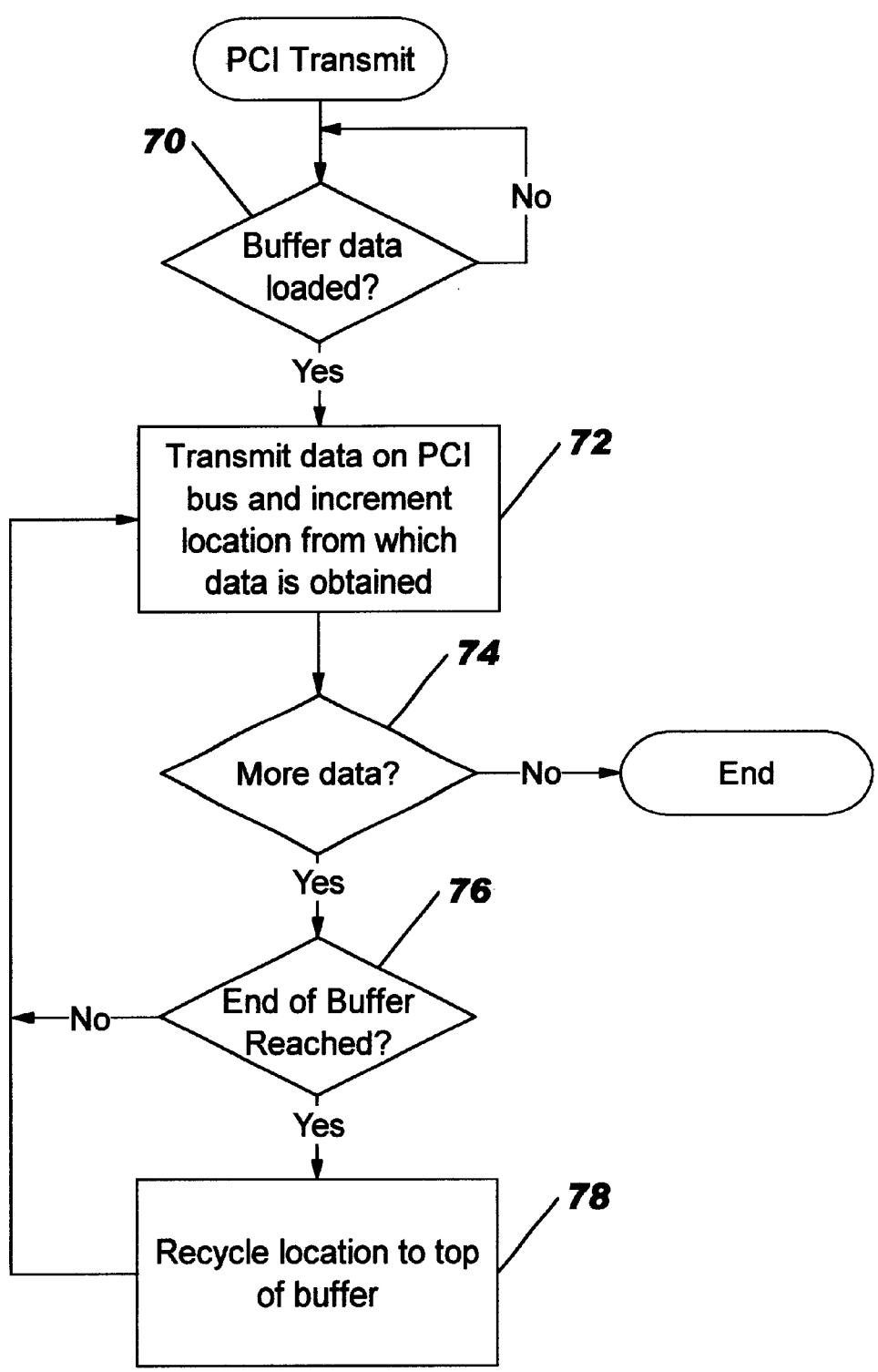
FIG. 5 is a flowchart illustrating the operations of the present invention from the perspective of the higher speed bus in transmitting data to the higher speed bus.

FIG. 5 illustrates the operations occurring on the PCI Bus 18 side of the Dual Port Buffer 10 while the operations of FIG. 4 are carried out. As seen in FIG. 5, when the buffer is full of data from the Internal Bus 20 or all of the data has been transferred to the buffer if the amount of data is less than the physical buffer size (block 70), the data is extracted from the Dual Port Buffer 10 at a starting location where the data was first stored (Block 72). The data is placed on the PCI Bus 18 and the location where the next bytes of data will be read from the Dual Port Buffer 10 is incremented to the next location of stored data (block 72).

After reading the data from the Dual Port Buffer 10, if more data is available (block 74) then it is determined if the end of the buffer has been reached (i.e. 4 bytes of data have been read from each storage location of the buffer)(block 76). If the end of the buffer has not been reached, then the next 4 bytes of data are read from the Dual Port Buffer 10 at the specified storage location, which is then incremented (blocks 76 and 72). However, if the end of the buffer has been reached, then the location from which the next 4 bytes of data of the data block will be read is set to the original starting storage location of the Dual Port Buffer 10 (block 78). The next 4 bytes of data read from the Dual Port Buffer 10 are read from the starting location (block 72). The storage location is then incremented and this process continues until all of the information of the data block has been read from the Dual Port Buffer 10 and placed on the PCI Bus 20.

As is seen in FIGS. 4 and 5, the benefits of the present invention may also be achieved in transferring data from the lower speed bus to the higher speed bus. These benefits are achieved by first filling the buffer with data and then beginning the higher speed transfer. The apparent size of the buffer in such a transfer is the amount of data which may be transferred to the buffer from the lower speed bus before the higher speed data transfer runs out of data in the buffer. If the buffer is filled before the higher speed transfer is begun, this apparent size is the same as the apparent size in the transfer from the higher speed bus to the lower speed bus.

The apparent size of the Dual Port Buffer 10 may be determined from the rates at which data may be transferred into and out of the Dual Port Buffer 10. More specifically, as is illustrated below, the apparent size of the Dual Port Buffer 10, (i.e., the maximum amount of data in the block of data) is the amount of data which may be simultaneously stored in the dual port buffer multiplied by a ratio of the rate at which data may be received by the Dual Port Buffer 10 from the first data bus (the PCI Bus 18) to the difference between the rate at which data may be received by the Dual Port Buffer 10 from the first data bus and the rate at which data may be transmitted on the second data bus (the Internal Bus 20) by the Dual Port Buffer 10. Alternatively, the maximum amount of data in a block of data may be determined by multiplying the amount of data which may be simultaneously stored in the Dual Port Buffer 10 by the ratio of the rate at which data may be transmitted by the dual port buffer to the first data bus (the PCI Bus 18) to the difference between the rate at which data may be transmitted by the dual port buffer to the first data bus and the rate at which data may be received from the second data bus (the Internal Bus 20) by the dual port buffer.

For purposes of illustration, the determination of the apparent size of an interface of the present invention will be described with reference to an 10/100 Mb PCI Ethernet Adapter operating at the 100 Mb rate. In such an adapter, the PCI Bus 18 operates at 30 nS/cycle and is 4 bytes in width. The Internal Bus operates at 40 nS/cycle and is also 4 bytes in width. Data may be stored in the Send RAM 14 and extracted from the Receive RAM 16 within the 40 nS cycle time of the Internal Bus 20. When operating at 100 Mb, the adapter may use up to 1 out of every 8 cycles of the Internal Bus 20 for data transfers from the Send RAM 14 to the Ethernet physical interface or to the Receive RAM 16 from the Ethernet physical interface.

In determining the apparent size of a buffer or, alternatively, the smallest size buffer which may be used with a block of data of given size, the data rates of the buses are preferably defined so as to assure that buffer overruns will not occur. Accordingly, it is preferred that the maximum transfer rate be used for the higher speed bus and the minimum guaranteed transfer rate be used for the lower speed bus. Thus, for example, the lower speed transfer rate preferably takes into account other traffic on the bus, delays in receiving a grant of the bus or other factors which may reduce the overall throughput on the lower speed bus. With respect to the higher speed bus, the data rate used to determine the apparent size of the buffer preferably is the highest possible data rate of the bus assuming best case conditions.

To determine the apparent size of a buffer used in the present example, the maximum data rate of the PCI bus is utilized. This data rate is 4 bytes per 30 nS. Thus, in time T, the amount of data sent to the buffer is 4T/30 bytes.

With respect to the internal bus, because the internal bus operates on 40 nS cycles, the best case amount of data which may be extracted from the buffer on the internal bus in time T is 4T/40 bytes. Furthermore, because the internal bus is a shared bus, the effect of other utilization should also be taken into account. For every 8 cycles on the internal bus it is possible that one of those cycle will be utilized by the Send or Receive RAMs for data transfer to or from the physical interface. Accordingly, the actual transfer rate of the data onto the internal bus is:

$$\frac{4T}{40} - \frac{4T}{320} = \frac{3.5T}{40}$$

Utilizing the data rates above, the data in the buffer at any given time T is then given by the equation:

$$bufferlevel(T) = x_{input}(T) - x_{output}(T) = \frac{4T}{30} - \frac{3.5T}{40}$$

where $x_{input}$ is the input data rate and $x_{output}$ is the output data rate. Solving for the amount of time it would take to fill the buffer ($T_{full}$) based on the maximum amount of data which may be stored in the buffer results in the following:

$$T_{full} = \frac{buffersize}{\frac{4}{30} - \frac{3.5}{40}}$$

The apparent size of the buffer is then the amount of data which is transferred into the buffer in time $T_{full}$ which is given by $x_{input}(T_{full})$ or in the present example:

$$Apparent\ Size = \frac{x_{input}}{x_{input} - x_{output}} buffersize = \frac{\frac{4}{30}}{\frac{4}{30} - \frac{3.5}{40}} buffersize$$

For a 128 byte buffer, in the present example, the apparent size would be 372.36 bytes which is rounded down to the nearest multiple of 4 (based on the bus width) which results in the apparent size being 372 bytes. Thus, a block of 372 bytes may be sent to the 128 byte buffer without causing an overrun.

Although the picoprocessor also shares the Internal Bus 20 with the Dual Port Buffer 10, the picoprocessor utilization of the bus does not overlap with transfers from or to the Dual Port Buffer 10 and, therefore, need not be considered in determining the apparent size of the buffer. Also, because in the present illustrative example the Arbitrator and State Machine 12 coordinates the bus accesses so as to eliminate delay in the acquisition of the buses, delays resulting from acquisition of the buses do not impact on the apparent size of the buffer.

In practice, the optimum performance is achieved only if the constraint placed on the system are those of the Dual Port Buffer's 10 ability to simultaneously read and write information. The timing of accesses from the two data buses should be coordinated by, for example, the Arbitrator and State Machine 12, so as to avoid an instance where the same location is being written to and read from at the same time. Otherwise, the Arbitrator and State Machine 12 need only have sufficient capabilities with respect to the present invention to control the access of the two buses such that the transfers are started as illustrated in FIGS. 2 through 5 so as to minimize the impact of delays in the system which would reduce the apparent size of the buffer.

While the present invention has been described with respect to the bi-directional transfers through the dual port buffer, as will be appreciated by those of skill in the art, the teachings of the present invention are equally applicable to unidirectional transfers. Thus, the present invention may be utilized for only one of receiving or transmitting data or for both receiving and transmitting data.

The present invention has also been described generally with respect to an Ethernet adapter. The specific implementation of the various other aspects of the Ethernet adapter are well known to those of skill in the art. Thus, the present invention may be readily incorporated into such an adapter based upon the disclosure herein. In any event, the present invention should not be construed as limited to Ethernet adapters but may be utilized in any of a number of situations where data is transferred across clock domains or where interfacing is required between buses operating at different speeds.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An interface circuit that interfaces between two buses operating at different speeds, comprising:
   a first input port that receives information from a first data bus at a first speed;
   a first output port that transmits information to a second data bus at a second speed, wherein the second speed is slower than the first speed; and
   a data storage device, operatively associated with the first input port and the first output port, that stores information received from the first bus by the first input port, wherein the data storage device provides an apparent size to the first data bus of greater than a physical size of the data storage device wherein data from a block of data of the apparent size transferred to the data storage device on the first data bus overwrites data from the block which has been provided to the first output port of the interface circuit.

2. An interface circuit that interfaces between two buses operating at different speeds, comprising:
   a first input port that receives information from a first data bus at a first speed;
   a first output port that transmits information to a second data bus at a second speed, wherein the second speed is slower than the first speed; and a data storage device, operatively associated with the first input port and the first output port, that stores information received from the first bus by the first input port, wherein the data storage device provides an apparent size to the first data bus of greater than a physical size of the data storage device; and
   wherein the size of the data storage device is less than a size of a block of data received from the first input port and greater than or equal to the size of the block multiplied by a ratio of the difference between the first speed and the second speed to the first speed.

3. An interface circuit according to claim 1, further comprising:
   a second input port that receives information from the second data bus at the second speed; and
   a second output port that transmits information to the first data bus at the first speed.

4. An interface circuit according to claim 3, wherein the first input port and the second output port comprise a first input/output port that receives information from and transmits information to the first data bus at the first speed, and wherein the second input port and the first output port comprise a second input/output port that receives information from and transmits information to the second data bus at the second speed.

5. The interface circuit according to claim 4, further comprising a state machine and arbitrator that coordinates access to the first data bus and the second data bus.

6. The interface according to claim 5, further comprising a random access memory buffer electrically connected to the second input/output port.

7. The interface according to claim 5, wherein the state machine and arbitrator causes the data storage device to be filled with data from the second data bus prior to initiating a data transfer from the first input/output port to the first data bus and then continues to allow data to be provided to the second input/output port while the transfer of data from the first input/output port to the first data bus progresses.

8. The interface according to claim 5, wherein the state machine and arbitrator allows data to be stored in the data storage device only when data can be transmitted from the data storage device through the second input/output port to the second data bus.

9. The interface according to claim 5, wherein the first data bus comprises a PCI data bus and wherein the second data bus comprises an internal data bus of an ethernet adapter.

10. A method of interfacing between two data buses operating at different speeds, the method comprising the steps of:
    receiving a block of data at a first port of a dual port buffer from a first data bus at a first speed, wherein an amount of data in the block of data is larger than an amount of data which can be simultaneously stored in the dual port buffer;
    transmitting a first portion of the data from the block of data from a second port of the dual port buffer to the second data bus at a second speed, slower than the first speed, while a remaining portion of the data from the block of data is received by the dual port buffer; and
    wherein an amount of data in the block of data is less than or equal to an amount of data which can be simultaneously stored in the dual port buffer multiplied by a ratio of a rate at which data can be received by the dual port buffer from the first data bus to the difference between the rate at which data can be received by the dual port buffer from the first data bus and a rate at which data can be transmitted on the second data bus by the dual port buffer.

11. A method of interfacing between two data buses operating at different speeds, the method comprising the steps of:
    receiving a block of data at a first port of a dual port buffer from a first data bus at a first speed, wherein an amount of data in the block of data is larger than an amount of data which can be simultaneously stored in the dual port buffer;
    transmitting a first portion of the data from the block of data from a second port of the dual port buffer to the second data bus at a second speed, slower than the first speed, while a remaining portion of the data from the block of data is received by the dual port buffer; and
    wherein said step of receiving a block of data comprises the steps of:
       storing initial data from the block of data in the dual port buffer, wherein the amount of data from the block of data corresponds to the amount of data which can be simultaneously stored in the dual port buffer in the dual port buffer; and then
       storing additional data from the block of data in the dual port buffer wherein the additional data is data from the block of data other than the initial data and is stored so as to overwrite at least a portion of the initial data.

12. A method according to claim 11 wherein said step of storing additional data comprises the step of storing additional data from the block of data in the dual port buffer wherein the additional data is data other than the initial data and is stored in a same sequence of storage locations of the dual port buffer beginning with the first storage location of the initial data from the block of data so as to overwrite at least a portion of the initial data.

13. A method of interfacing between two data buses operating at different speeds, the method comprising the steps of:
receiving a first portion of a block of data at a second port of a dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer; and then
transmitting the first portion of the data from the block of data from a first port of the dual port buffer to a first data bus at a first speed, wherein the first speed is higher than the second speed, while a remaining portion of the data from the block of data is received by the second port of the dual port buffer; and
wherein the size of the block of data is less than or equal to the amount of data which can be simultaneously stored in the dual port buffer multiplied by a ratio of a rate at which data can be transmitted by the dual port buffer to the first data bus to the difference between the rate at which data can be transmitted by the dual port buffer to the first data bus and a rate at which data can be received from the second data bus by the dual port buffer.

14. A method according to claim 13, wherein said step of receiving a first portion of a block of data includes the step of storing the first portion of the block of data in the dual port buffer, wherein the amount of data in the first portion of the block of data corresponds to the amount of data which can be simultaneously stored in the dual port buffer.

15. A method of interfacing between two data buses operating at different speeds, the method comprising the steps of:
receiving a first portion of a block of data at a second port of a dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer; and then
transmitting the first portion of the data from the block of data from a first port of the dual port buffer to a first data bus at a first speed, wherein the first speed is higher than the second speed, while a remaining portion of the data from the block of data is received by the second port of the dual port buffer;
wherein said step of receiving a first portion of a block of data includes the step of storing the first portion of the block of data in the dual port buffer, wherein the amount of data in the first portion of the block of data corresponds to the amount of data which can be simultaneously stored in the dual port buffer; and
wherein said step of transmitting the first portion of the block of data includes the step of storing remaining portions of the block of data received at the second port of the dual port buffer in the dual port buffer wherein the [additional amount of data remaining portions of the block of data is data other that the first portion of the block of data and is stored so as to overwrite at least a portion of the first portion of the block of data.

16. A method of interfacing between two data buses operating at different speeds, the method comprising the steps of:
receiving a first portion of a block of data at a second port of a dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer; and then
transmitting the first portion of the data from the block of data from a first port of the dual port buffer to a first data bus at a first speed, wherein the first speed is higher than the second speed, while a remaining portion of the data from the block of data is received by the second port of the dual port buffer;
wherein said step of receiving a first portion of a block of data includes the step of storing the first portion of the block of data in the dual port buffer, wherein the amount of data in the first portion of the block of data corresponds to the amount of data which can be simultaneously stored in the dual port buffer; and
wherein said step of storing remaining portions of the block of data comprises the step of storing additional data from the block of data in the dual port buffer wherein the additional data is data other than data from the first portion of the block of data and is stored in a same sequence of storage locations of the dual port buffer beginning with the first storage location of the first portion of the block of data so as to overwrite at least a portion of the first portion of the block of data.

17. An apparatus that interfaces between two data buses operating at different speeds, comprising:
a dual port buffer;
means for receiving a block of data at a first port of the dual port buffer from a first data bus at a first speed, wherein an amount of data in the block of data is larger than an amount of data which can be simultaneously stored in the dual port buffer;
means for transmitting a first portion of the data from the block of data from a second port of the dual port buffer to the second data bus at a second speed, slower than the first speed, while a remaining portion of the data from the block of data is received by the dual port buffer; and
wherein said means for receiving a block of data comprises:
means for storing initial data from the block of data in the dual port buffer, wherein the amount of data from the block of data corresponds to the amount of data which can be simultaneously stored in the dual port buffer in the dual port buffer; and
means for storing additional data from the block of data in the dual port buffer wherein the additional data is data other than the initial data and is stored so as to overwrite at least a portion of the initial data.

18. An apparatus that interfaces between two data buses operating at different speeds, comprising:

a dual port buffer;

means for receiving a block of data at a first port of the dual port buffer from a first data bus at a first speed, wherein an amount of data in the block of data is larger than an amount of data which can be simultaneously stored in the dual port buffer;

means for transmitting a first portion of the data from the block of data from a second port of the dual port buffer to the second data bus at a second speed, slower than the first speed, while a remaining portion of the data from the block of data is received by the dual port buffer; and wherein an amount of data in the block of data is less than or equal to an amount of data which can be simultaneously stored in the dual port buffer multiplied by a ratio of a rate at which data can be received by the dual port buffer from the first data bus to the difference between the rate at which data can be received by the dual port buffer from the first data bus and a rate at which data can be transmitted on the second data bus by the dual port buffer.

19. An apparatus according to claim 17, wherein said means for storing additional data comprises means for storing additional data from the block of data in the dual port buffer wherein the additional data is data other than the initial data and is stored in a same sequence of storage locations of the dual port buffer beginning with the first storage location of the initial data from the block of data so as to overwrite at least a portion of the initial data.

20. An apparatus that interfaces between two data buses operating at different speeds, comprising:

a dual port buffer;

means for receiving a first portion of a block of data at a second port of the dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer;

means for transmitting the first portion of the data from the block of data from a first port of the dual port buffer to a first data bus at a first speed, wherein the first speed is higher than the second speed, while a remaining portion of the data from the block of data is received by the second port of the dual port buffer; and wherein said means for transmitting the first portion of the block of data includes means for storing remaining portions of the block of data received at the second port of the dual port buffer in the dual port buffer wherein the remaining portions of the block of data is data other than data from the first portion of the block of data and is stored so as to overwrite at least a portion of the first portion of the block of data.

21. An apparatus that interfaces between two data buses operating at different speeds, comprising:

a dual port buffer;

means for receiving a first portion of a block of data at a second port of the dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer;

means for transmitting the first portion of the data from the block of data from a first port of the dual port buffer to a first data bus at a first speed, wherein the first speed is higher than the second speed, while a remaining portion of the data from the block of data is received by the second port of the dual port buffer; and wherein the size of the block of data is less than or equal to the amount of data which can be simultaneously stored in the dual port buffer multiplied by a ratio of a rate at which data can be transmitted by the dual port buffer to the first data bus to the difference between the rate at which data can be transmitted by the dual port buffer to the first data bus and a rate at which data can be received from the second data bus by the dual port buffer.

22. An apparatus according to claim 20, wherein said means for receiving a first portion of a block of data includes means for storing the first portion of the block of data in the dual port buffer, wherein the amount of data in the first portion of the block of data corresponds to the amount of data which can be simultaneously stored in the dual port buffer.

23. A computer program product for interfacing between two data buses operating at different speeds, the computer program product comprising:

a computer-readable storage medium having computer-readable program code means embodied in said medium, said computer-readable program code means comprising:

computer-readable program code means for receiving a block of data at a first port of a dual port buffer from a first data bus at a first speed, wherein an amount of data in the block of data is larger than an amount of data which can be simultaneously stored in the dual port buffer;

computer-readable program code means for transmitting a first portion of the data from the block of data from a second port of the dual port buffer to the second data bus at a second speed, slower than the first speed, while a remaining portion of the data from the block of data is received by the dual port buffer; and wherein said computer-readable program code means for receiving a block of data comprises:

computer-readable program code means for storing initial data from the block of data in the dual port buffer, wherein the amount of data from the block of data corresponds to the amount of data which can be simultaneously stored in the dual port buffer in the dual port buffer; and computer-readable program code means for storing additional data from the block of data in the dual port buffer wherein the additional data is data other than the initial data and is stored so as to overwrite at least a portion of the initial data.

24. A computer program product for interfacing between two data buses operating at different speeds, the computer program product comprising:

a computer-readable storage medium having computer-readable program code means embodied in said medium, said computer-readable program code means comprising:

computer-readable program code means for receiving a block of data at a first port of a dual port buffer from a first data bus at a first speed, wherein an amount of data in the block of data is larger than an amount of data which can be simultaneously stored in the dual port buffer;

computer-readable program code means for transmitting a first portion of the data from the block of data from a second port of the dual port buffer to the second data bus at a second speed, slower than the first speed, while a remaining portion of the data from the block of data is received by the dual port buffer; and wherein an amount of data in the block of data is less than or equal to an amount of data which can be simultaneously stored in the dual port buffer multiplied by a ratio of a rate at which data can be received by the dual port buffer from the first data bus to the difference between the rate at which data can be received by the dual port buffer from the first data bus and a rate at which data can be transmitted on the second data bus by the dual port buffer.

25. A computer program product according to claim 23, wherein said computer-readable program code means for storing additional data comprises computer-readable program code means for storing additional data from the block of data in the dual port buffer wherein the additional data is data other than the initial data and is stored in a same sequence of storage locations of the dual port buffer beginning with the first storage location of the initial data from the block of data so as to overwrite at least a portion of the initial data.

26. A computer program product for interfacing between two data buses operating at different speeds, the computer program product comprising:

computer-readable program code means for receiving a first portion of a block of data at a second port of a dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer;

computer-readable program code means for transmitting the first portion of the data from the block of data from a first port of the dual port buffer to a first data bus at a first speed, wherein the first speed is higher than the second speed, while a remaining portion of the data from the block of data is received by the second port of the dual port buffer; and wherein the size of the block of data is less than or equal to the amount of data which can be simultaneously stored in the dual port buffer multiplied by a ratio of a rate at which data can be transmitted by the dual port buffer to the first data bus to the difference between the rate at which data can be transmitted by the dual port buffer to the first data bus and a rate at which data can be received from the second data bus by the dual port buffer.

27. A computer program product according to claim 26, wherein said computer-readable program code means for receiving a first portion of a block of data includes computer-readable program code means for storing the first portion of the block of data in the dual port buffer, wherein the amount of data in the first portion of the block of data corresponds to the amount of data which can be simultaneously stored in the dual port buffer.

28. A computer program product for interfacing between two data buses operating at different speeds, the computer program product comprising:

computer-readable program code means for receiving a first portion of a block of data at a second port of a dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer;

computer-readable program code means for transmitting the first portion of the data from the block of data from a first port of the dual port buffer to a first data bus at a first speed, wherein the first speed is higher than the second speed, while a remaining portion of the data from the block of data is received by the second port of the dual port buffer;

wherein said computer-readable program code means for receiving a first portion of a block of data includes computer-readable program code means for storing the first portion of the block of data in the dual port buffer, wherein the amount of data in the first portion of the block of data corresponds to the amount of data which can be simultaneously stored in the dual port buffer; and wherein said computer-readable program code means for transmitting the first portion of the block of data includes computer-readable program code means for storing remaining portions of the block of data received at the second port of the dual port buffer in the dual port buffer wherein the remaining portions of the block of data is data other than the first portion of the block of data and is stored so as to overwrite at least a portion of the first portion of the block of data.

29. A computer program product for interfacing between two data buses operating at different speeds, the computer program product comprising:

computer-readable program code means for receiving a first portion of a block of data at a second port of a dual port buffer from a second data bus operating at a second speed, wherein an amount of data in the block of data is larger than an amount of data which can be simultaneously stored in the dual port buffer and wherein the first portion of the block of data comprises an amount less than or equal to the amount of data which can be simultaneously stored in the dual port buffer;

computer-readable program code means for transmitting the first portion of the data from the block of data from a first port of the dual port buffer to a first data bus at a first speed, wherein the first speed is higher than the second speed, while a remaining portion of the data from the block of data is received by the second port of the dual port buffer;

wherein said computer-readable program code means for receiving a first portion of a block of data includes computer-readable program code means for storing the first portion of the block of data in the dual port buffer, wherein the amount of data in the first portion of the block of data corresponds to the amount of data which can be simultaneously stored in the dual port buffer; and wherein said computer-readable program code means for storing remaining portions of the block of data comprises computer-readable program code means for storing additional data from the block of data in the dual port buffer wherein the additional data is data other than data from the first portion of the block of data and is stored in a same sequence of storage locations of the dual port buffer beginning with the first storage location of the first portion of the block of data so as to overwrite at least a portion of the first portion of the block of data.

* * * * *